June 2, 1959 — N. C. COATE — 2,889,047
SEPTIC TANK
Filed Nov. 30, 1956 — 2 Sheets-Sheet 1
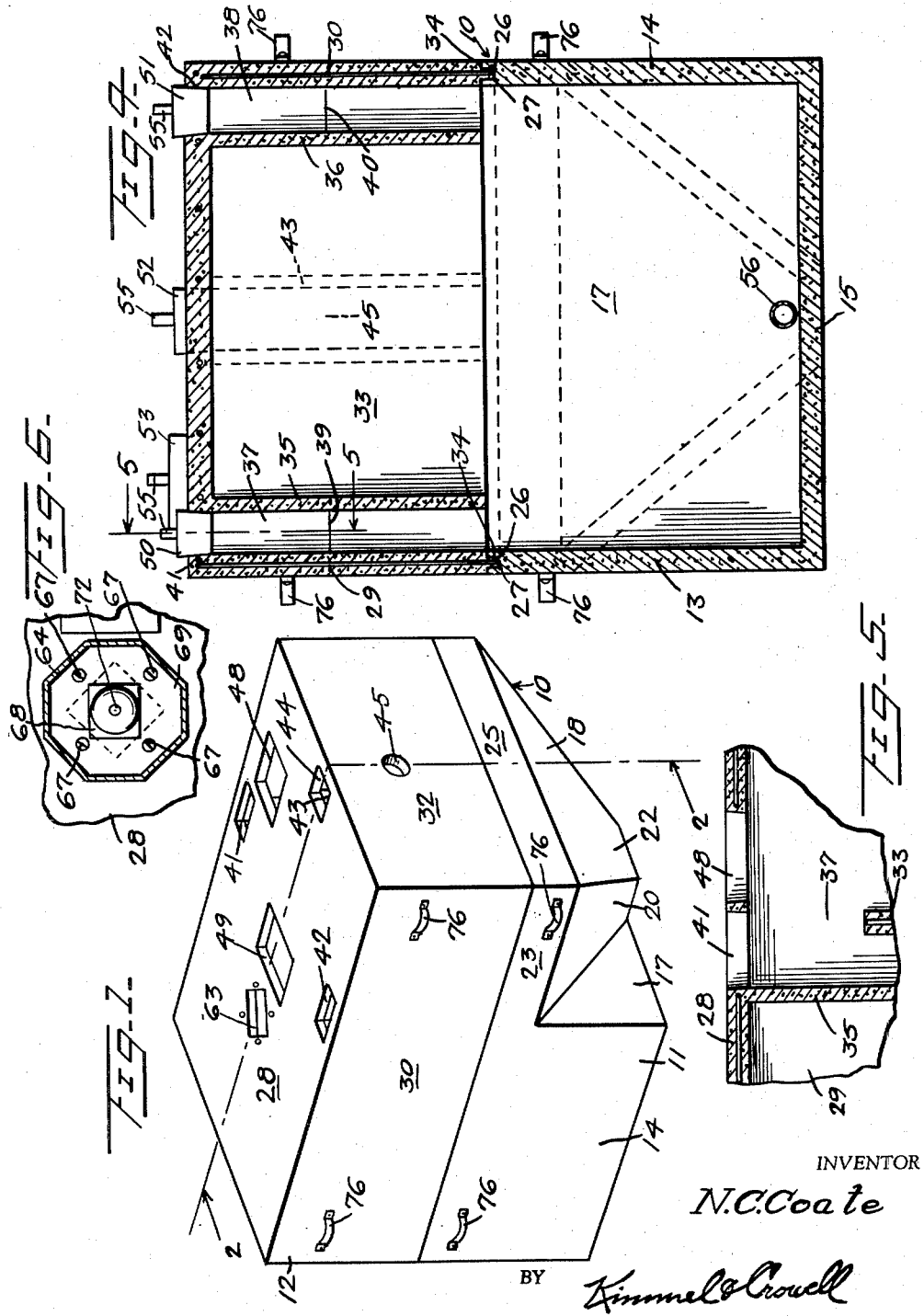
INVENTOR
N.C.Coate
BY Kimmel & Crowell
ATTORNEYS

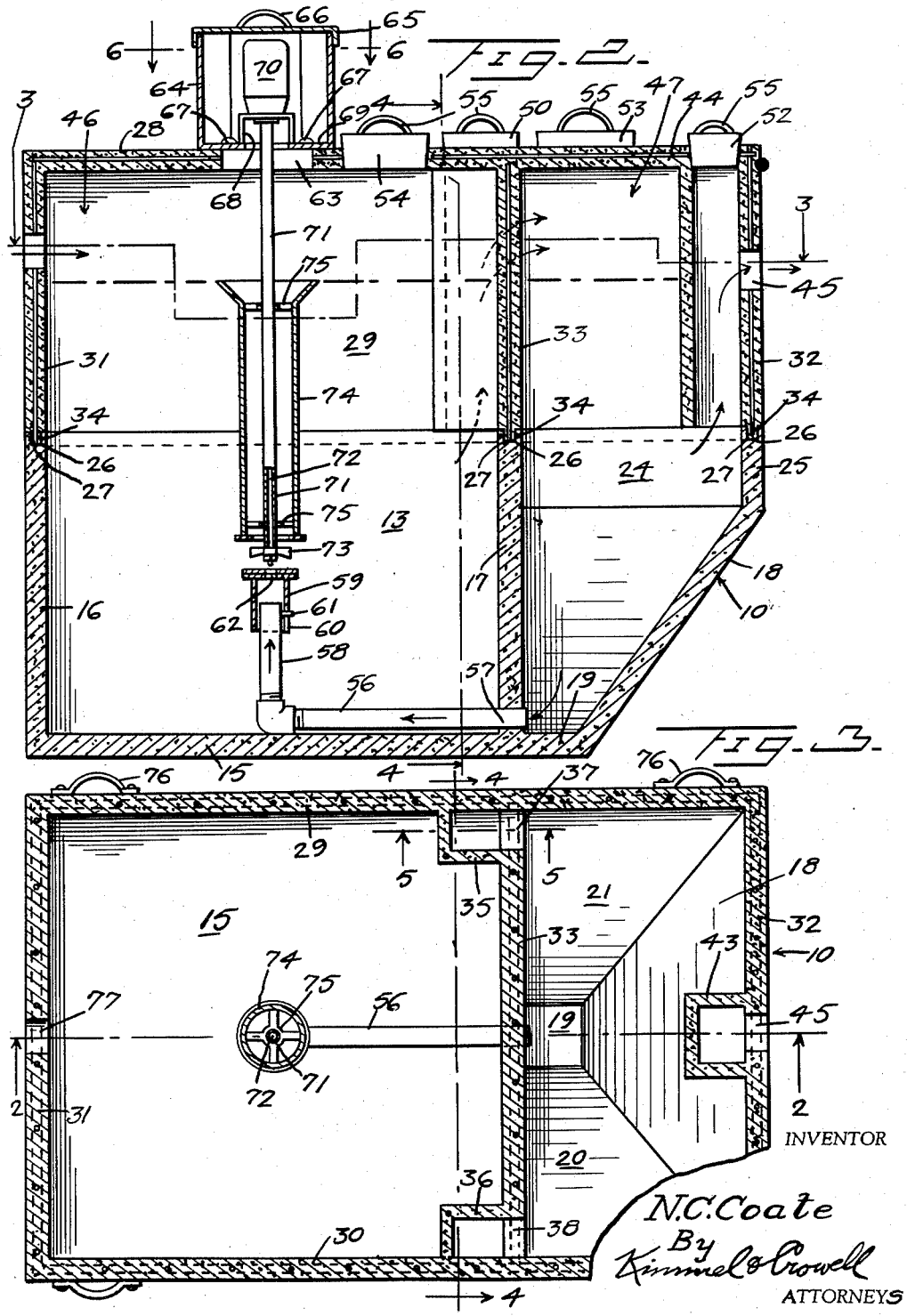

United States Patent Office 2,889,047
Patented June 2, 1959

2,889,047

SEPTIC TANK

Ned C. Coate, West Milton, Ohio, assignor to Cecil Coate, West Milton, Ohio

Application November 30, 1956, Serial No. 625,313

5 Claims. (Cl. 210—197)

The present invention relates to septic tanks, and more particularly to septic tanks which dispose of sewage through oxidation processes.

The primary object of the invention is to provide a septic tank having a mechanical agitation mechanism associated therewith so that the sewage may be oxidized due to aeration.

Another object of the invention is to provide a septic tank of the class described above having compartments through which the sewage circulates during the oxidation process.

A further object of the invention is to provide a septic tank of the class described above cast in two parts from reinforced concrete having the partitions between compartments cast integral therein.

A still further object of the invention is to provide a septic tank of the class described above which is inexpensive to manufacture, simple to install, and which completely disposes of the sewage placed therein.

Other objects and advantages will become apparent in the following specification when considered in the light of the attached drawings, in which:

Figure 1 is a perspective view of the invention.

Figure 2 is a longitudinal vertical cross-section taken along the line 2—2 of Figure 1, looking in the direction indicated.

Figure 3 is a horizontal cross-section taken substantially along the line 3—3 of Figure 2, looking in the direction indicated.

Figure 4 is a transverse vertical cross-section taken along the line 4—4 of Figure 2, and the line 4—4 of Figure 3, substantially in the direction indicated.

Figure 5 is an enlarged fragmentary vertical cross-section taken along the line 5—5 of Figure 3, looking in the direction indicated.

Figure 6 is a fragmentary horizontal cross-section taken along the line 6—6 of Figure 2, looking in the direction indicated.

Referring now to the drawings in detail wherein like reference characters indicate like parts throughout the several figures, the reference numeral 10 indicates generally a septic tank constructed in accordance with the invention.

The septic tank 10 comprises a generally rectangular lower portion 11 and a generally rectangular upper portion 12 supported thereon. The septic tank 10 is cast in two pieces 11 and 12, respectively, to facilitate the casting operation and the installing of the device.

The lower portion 11 of the septic tank 10 comprises a side wall 13, a side wall 14 arranged in spaced parallel relation thereto, a bottom wall 15 extending between the lower edges of the side walls 13 and 14 and cast integrally therewith, and an upright end wall 16 extending between one end of the side walls 13 and 14, respectively, and cast integrally therewith and with the bottom wall 15. A transverse wall 17 extends between the side walls 13 and 14 and upwardly from the bottom wall 15 in spaced parallel relation to the wall 16.

A hopper 18 is formed on the end of the lower portion 11 opposite the end wall 16 and comprises a bottom wall 19 arranged in aligned relation to the bottom wall 15. Upwardly and outwardly sloping hopper side walls 20 and 21, respectively, extend upwardly from the bottom wall 19 and have one of their respective edges formed integrally with the wall 17. An upwardly and outwardly sloping end wall 22 extends between the walls 20 and 21 and projects upwardly from the bottom wall 19.

The hopper 18 is provided with upright side walls 23 and 24 which are aligned with the side walls 13 and 14, respectively, and an upright end wall 25 arranged in parallel relation to the transverse wall 17. The hopper 18 and all of the walls of the lower portion 11 are formed in an integral casting of reinforced concrete in any conventional manner.

A groove 26 is formed in the upper edge of each of the walls 13, 14, 15, 16, 17, 23, 24 and 25, and a mastic 27 is contained therein.

The upper portion 12 of the septic tank 10 comprises a top wall 28, depending side walls 29 and 30, depending end walls 31 and 32, and a transverse wall 33. The walls 29, 30, 31, 32, 33, and the top wall 28 are cast integrally of reinforced concrete in any desired manner. The walls 29, 30, 31, 32 and 33 align, respectively, with the walls 13, 14, 16, 25 and 17, and are adapted to rest thereon. A tongue 34 is formed on the bottom edge of each of the walls 29, 30, 31, 32 and 33 extending into the groove 26 sealing against the mastic 27.

A rectangular tubular housing 35 is formed in the corner between the side wall 29 and the transverse wall 33 in the upper portion 12 of the septic tank 10, and a similar rectangular tubular housing 36 is formed in the corner between the side wall 30 and the transverse wall 33 in parallel relation to the housing 35. Elongated slots 37 and 38 extend into the housings 35 and 36, respectively, through the transverse wall 33 adjacent the upper edge thereof terminating at 39 and 40 spaced well above the lower edge of the transverse wall 33.

Rectangular openings 41 and 42 extend through the top wall 28 in alignment with the housings 35 and 36, respectively, as best seen in Figure 1. A rectangular housing 43 is formed on the end wall 32 of the upper portion 11 intermediate the side walls 29 and 30, as best seen in Figures 2 and 3. The rectangular tubular housing 43 is provided with a rectangular opening 44 through the top wall 28, as best seen in Figures 1 and 2. A lateral port 45 extends through the end wall 32 into communication with the housing 43.

The transverse walls 17 and 33 divide the septic tank 10 into two compartments, indicated generally at 46 and 47. The top wall 28 is provided with an opening 48 extending into the compartment 47 for access thereto. A manhole 49 extends through the top wall 28 into the compartment 46 to give access thereto. The openings 41, 42, 44, 48 and 49 are closed by blocks 50, 51, 52, 53 and 54, respectively. The blocks 50, 51, 52, 53 and 54 are each provided with a handle 55 for convenience of removal.

The compartment 46 has positioned in the bottom thereof an L-shaped pipe 56 having one end 57 extending through the bottom of the transverse wall 17 adjacent the bottom wall 19. The L-shaped pipe 56 has a leg 58 thereof extending perpendicularly centrally of the compartment 46. A tubular cap 59 telescopically engages over the upper end of the leg 58 and is provided with a bayonet slot 60. A pin 61 secured to the leg 58 is engaged by the bayonet slot 60 to hold the cap 59 on the leg 58. The cap 59 has central openings 62 axially aligned with the leg 58.

The top wall 28 is provided with an opening 63 into the compartment 46 in alignment with the leg 58. A housing 64 is secured to the top wall 28 in overlying relation to the opening 63 and is provided with a removable cover 65 having a handle 66 thereon. The housing 64 is secured to the top wall 28 by means of securing elements 67 and has a bracket 68 arranged therein in spaced relation to the bottom 69 of the housing.

An electric motor 70 is secured to the bracket 68 and has its axis aligned with the axis of the leg 58. A shaft housing 71 extends downwardly from the motor 70 carried by the bracket 68. A drive shaft 72 extends through the housing 71 and carries an impeller blade 73 on its lower end. The shaft 72 is connected to the motor 70 and is driven thereby. A tubular guideway 74 is arranged slightly above the impeller blade 73 and is mounted to the tubular housing 71 by means of spiders 75.

The septic tank 10 is provided with a plurality of handles 76 for convenience of moving the septic tank 10 from its point of manufacture to its point of use. The end wall 31 is provided with a central opening 77 into the compartment 46 at a point above the tubular guideway 74.

In the use and operation of the invention, the opening 77 will be connected to the sewage pipe of the building and sewage will flow therethrough into the compartment 46. The sewage will remain in the compartment 46 for a period of time while oxidation thereof takes place. As additional sewage flows into the compartment 46 the lighter components thereof will flow into the compartment 47 through the openings 37 and 38 by flowing upwardly through the housings 35 and 36. The housings 35 and 36 will prevent the fresh sewage from flowing directly into the compartment 47 without first being partially oxidized within the compartment 46.

The compartment 47 will act as a clarifier chamber and solid material entering therein through the openings 37 and 38 will settle into the hopper bottom while the fluid materials will flow upwardly through the housing 43 and out the opening 45 into a septic tank field or other disposal area.

The impeller or agitator blade 73, driven by the motor 70, moves material radially outwardly therefrom which creates a flow through the pipe 56 moving the solids collected in the bottom of the hopper 18 back to the compartment 46 for further oxidation and disintegration. Furthermore, the radial outward movement of material by the impeller blade 73 will move material downwardly through the guideway 74 creating a circulation within the tank or compartment 46 so that aeration may take place with a resultant oxidation of the sewage.

As can be readily seen from the foregoing description, the instant septic tank is not dependent upon bacterial action for the disintegration of the sewage, but utilizes power agitated oxidation to obtain this result.

Having thus described the preferred embodiment of the invention, it should be understood that numerous structural modifications and adaptations may be resorted to without departing from the scope of the appended claims.

What is claimed is:

1. A septic tank comprising a reinforced concrete tank including upper and lower sections joined along a horizontal plane intermediate the upper and lower ends of said tank, means sealing the engaging edges of said sections, a partition extending vertically in said tank dividing said tank into an oxidation compartment and a clarification compartment, a pair of vertically extending tubular housings formed in said oxidation compartment having the lower end thereof terminating at the lower end of said upper section and having the upper end thereof communicating through said partition with said clarification compartment, said housings providing sewage passage openings for permitting a flow of oxidized sewage to pass from said oxidation compartment to said clarification compartment, a tubular housing formed in said clarification compartment having the lower end thereof terminating at the lower end of said upper section, said last named housing communicating with a discharge port adjacent the upper end of said clarification compartment, said oxidation compartment having an inlet port formed therein adjacent the upper end thereof, a settling hopper formed on the bottom of said clarification compartment, and mechanical means extending into said oxidation compartment for agitating the sewage in said oxidation compartment and simultaneously withdrawing solids collected in said hopper and dispersing said solids in the oxidation compartment.

2. A device as claimed in claim 1 wherein said upper section is provided with a plurality of normally closed access openings communicating with said oxidation compartment, said clarification compartment, said pair of housings and said last named housing to permit the complete cleaning of the septic tank when required.

3. A device as claimed in claim 1 wherein said oxidation compartment is provided with a guide housing arranged in upright relation centrally thereof, and said agitating means is arranged at the lower end of said guide housing.

4. A device as claimed in claim 1 wherein said agitation means includes an electric motor, means securing said electric motor to said tank, an elongated drive shaft extending into said tank, and an impeller member mounted on the lower end of said drive shaft and adapted to be driven thereby.

5. A device as claimed in claim 3 wherein said agitating means is effective to draw sewage downwardly through said guide housing dispersing it outwardly at the lower end of said housing.

References Cited in the file of this patent

UNITED STATES PATENTS

| | | |
|---|---|---|
| 802,714 | Smith | Oct. 24, 1905 |
| 1,422,674 | Cook | July 11, 1922 |
| 1,722,945 | Pruss | July 30, 1929 |
| 2,090,384 | Durdin | Aug. 17, 1937 |
| 2,430,519 | Mallory | Nov. 11, 1947 |
| 2,726,767 | Rakowsky | Dec. 13, 1955 |
| 2,792,125 | Gallacher | May 14, 1957 |

FOREIGN PATENTS

| | | |
|---|---|---|
| 351,079 | France | Apr. 29, 1905 |
| 6,487 | Australia | 1927 |